United States Patent [19]

Cooksey

[11] Patent Number: 4,986,690
[45] Date of Patent: Jan. 22, 1991

[54] CONNECTOR ASSEMBLY FOR WIRELINE TOOL STRING

[75] Inventor: Andrew G. Cooksey, Coppell, Tex.

[73] Assignee: Otis Engineering Corp., Dallas, Tex.

[21] Appl. No.: 473,344

[22] Filed: Feb. 1, 1990

Related U.S. Application Data

[63] Continuation-in-part of Ser. No. 343,531, Apr. 26, 1989, abandoned.

[51] Int. Cl.⁵ .................... F16C 3/00; F16D 1/10
[52] U.S. Cl. .................... 403/319; 403/27; 403/314; 403/325; 403/327; 403/348; 403/353; 403/354
[58] Field of Search ............ 403/300, 305, 314, 317, 403/320, 319, 325–327, 348–349, 353–354, 29; 24/591, 593, 596–597; 285/376

[56] References Cited

U.S. PATENT DOCUMENTS

| | | | |
|---|---|---|---|
| 805,674 | 11/1905 | Senderling | 403/348 X |
| 906,217 | 12/1908 | Gaylord | 285/376 X |
| 1,130,726 | 3/1915 | Greve | 403/348 X |
| 1,415,658 | 5/1922 | Lane | 403/27 |
| 2,551,577 | 5/1951 | Baum | 403/27 X |
| 2,617,166 | 11/1952 | Kaufmann | 403/349 X |
| 3,098,667 | 7/1963 | Greenwood | 285/376 |
| 3,849,007 | 11/1974 | Recker | 403/27 |
| 4,110,157 | 8/1978 | Jabsen | 403/317 X |
| 4,679,959 | 7/1987 | Cavallaro | 403/317 X |

FOREIGN PATENT DOCUMENTS

| | | | |
|---|---|---|---|
| 928506 | 12/1947 | France | 403/349 |
| 381816 | 9/1973 | U.S.S.R. | 403/319 |
| 106422 | 5/1917 | United Kingdom | 403/349 |
| 320602 | 10/1929 | United Kingdom | 403/341 |

OTHER PUBLICATIONS

Bowen Tools Inc., 1984–85 General Catalog (3 pages).
Pressure Control Engineering Ltd., Product No. B063, 2 pages, dated 7/88.

*Primary Examiner*—Randolph A. Reese
*Assistant Examiner*—Franco S. DeLiGuori
*Attorney, Agent, or Firm*—Ross, Howison, Clapp & Korn

[57] ABSTRACT

A connector assembly adapted to quickly connect and disconnect tools and stem sections in wireline tool strings. Connector assembly (10) comprises box end (12) and pin end (14) adapted to be slidably engaged and locked by rotating either end 90° relative to the other in either direction. Connector assembly (10) is released by the direct application of manual force to ears (48, 50) of locking plate (38) accessible in flutes (26, 27) of box end (12). Once the locking plate is retracted, pin end (14) is rotated 90° in either direction relative to box end (12) and then withdrawn axially from box end (12). Flats (130, 131) are provided on box end (126) and pin end (128) to indicate relative rotational alignment. Disclosed also are provisions for limiting the rotation of axially spaced lugs (138, 140) before the lugs are axially aligned with annular channels (142, 144).

11 Claims, 5 Drawing Sheets

FIG. 11

CONNECTOR ASSEMBLY FOR WIRELINE TOOL STRING

CROSS-REFERENCE TO RELATED APPLICATION

This application is a continuation-in-part of Ser. No. 343,531, filed Apr. 26, 1989, now abandoned.

BACKGROUND OF THE INVENTION

1. Field of the Invention

This invention relates to apparatus useful for quickly connecting and disconnecting tools and stem sections in a wireline tool string.

2. Description of the Prior Art

Wireline equipment is frequently used to install and retrieve well tools through a flow conductor disposed in a well bore. In the past, wireline tool strings have been assembled from components have traditional "sucker-rod" threads. Making and breaking such threaded connections has previously required the use of pipe wrenches. Workers have often sustained injuries from slipping wrenches and from burrs caused by the use of such wrenches. The use of such wrenches has also increased the wear and tear on tools. Improperly threaded connections and stripped threads have also contributed to back-offs and other downhole failures, necessitating fishing trips with their associated downtime and expense.

In an effort to overcome problems previously encountered with threaded connections, coupling devices have been produced that utilize a bayonet-type connection in which a pin end comprising locking lugs is inserted into a box end comprising annular recesses adapted to receive the locking lugs. When the pin end is rotated relative to the box end, the locking lugs engage shoulders that limit further axial movement therebetween; Spring-biased locking members have also been disclosed for use in restricting further rotational movement between the pin and box ends once they are fully engaged and the locking lugs are rotated into the locking position within the annular recesses. However, other difficulties have been encountered with these connectors.

Some of the conventional, commercially available connectors undesirably require the use of a special wrench, key, or other tool for releasing the pin and box ends during disassembly.

Others, particularly those having axially spaced sets of locking lugs on the pin end, are susceptible to being rotated before the pin end has been fully inserted into the box end during assembly. This causes delay in realigning, fully inserting, rotating and locking the pin end in the box end.

Unintended hang-up can similarly occur during disassembly if the pin end is rotated slightly during withdrawal, causing one set of locking lugs to undesirably engage the wrong annular recess. This also necessitates realignment before the pin and box ends of the connector assembly can be axially disengaged.

Finally, difficulties have been encountered because conventional quick-lock connector assemblies lack external indicia that enable users to determine relative rotational alignment between the pin and box ends at a glance.

A manually operable connector assembly for use with wireline tool strings is therefore needed that does not require the use of wrenches or other special tools, that comprises pin and box ends which cannot be unintentionally rotated into hang-up during assembly or disassembly, and that comprises external indicia which enable users to determine relative rotational alignment between the pin and box ends.

SUMMARY OF THE INVENTION

The manually operable connector assembly disclosed herein can be quickly and conveniently used to connect or disconnect the elements of a conventional wireline tool string without the need for wrenches or special tools. The subject invention comprises a total shear area greater than that of a conventional threaded connection and rotationally locks the connected elements, thereby preventing them from swiveling or accidentally backing off downhole. The connector assembly disclosed herein is adapted to releasably lock abutting wireline tools and stem sections into rotationally restricted longitudinal alignment with each other. The latch mechanism of the invention snaps into position when fully locked, providing a clear indication to the operator that the pin and box ends of the connector are fully engaged. According to one embodiment of the invention, the pin and box ends of the subject connector assembly can be manufactured onto the ends of conventional wireline tools and stem sections in place of the threads previously used.

According to another embodiment of the invention, existing wireline tools and stem sections can be retrofitted to utilize the connector assembly of the invention by threading pin and box ends of the subject connector assembly onto the already-threaded ends of such tools or stem sections. According to a particularly preferred embodiment of the invention, pins are inserted transversely through the threaded connections of tools and stem sections retrofitted in this manner so as to restrict any further relative rotational movement between the tool or stem section and the subject connector assembly. Through use of this embodiment of the invention, wireline tools and stem sections can be retrofitted in the shop and thereafter used in the field in the same manner as wireline tools and stem sections newly manufactured with pin and box ends of the connector assembly as disclosed herein, thereby obviating any need to make or break threaded connections during wireline operations in the field.

According to another embodiment of the invention, connector assemblies comprising pin and box ends as disclosed herein can be provided for threaded engagement with existing tooling at the use site, thereby facilitating more rapid assembly and disassembly of tools and stem sections while running the wireline tool string into and out of the well bore. This embodiment of the invention is preferred for use in those situations or operations where there is less likelihood of swiveling or back-off.

The subject invention preferably comprises pin and box ends adapted to be slidably engaged, rotated and locked. Locking is achieved by rotating either the pin or box end 90° relative to the other in either direction, and effectively restricts any further translational or rotational movement therebetween until the connector assembly is unlocked. Unlocking is preferably accomplished by manually retracting the lock plate, rotating either the pin or box end 90° relative to the other in either direction, and slidably disengaging the two ends.

Locking and unlocking of the connector assembly of the invention is easily accomplished through the application of manual force by one person without the need for wrenches or other tools.

The connector assembly described herein provides audio and visual indication to the user whenever the locking plate snaps into engagement and the assembly is fully locked. Once locked, according to a preferred embodiment of the invention, the locking plate will not disengage sufficiently to permit unlocking except by the simultaneous application of force to both ears of the locking plate. Thus, the locking plate will not fully release if one ear snags on an obstruction or protruding object within the well bore.

According to another embodiment of the invention, a quick-lock connector assembly is provided that comprises a pin end having a plurality of axially spaced locking lugs, a box end having a plurality of axially spaced annular recesses adapted to receive the axially spaced locking lugs when the pin end is fully inserted into the box end, and means for limiting relative rotational motion between the pin and box ends until the pin end is fully inserted into the box end. The distance between the axially spaced locking lugs is preferably less than the distance from the open end of the box end to the first annular recess, thereby preventing the axially spaced locking lugs nearest the free end of the pin end from being rotated into an annular recess that will not permit full engagement between the pin and box ends.

According to another preferred embodiment of the invention, a connector assembly is provided for use with wireline tool strings that comprises a pin end, a box end, and externally visible indicia on the pin and box ends that enable users to determine the relative rotational alignment between the pin and box ends. According to a particularly preferred embodiment of the invention, the externally visible indicia are flats milled into the outside surfaces of the pin and box ends adjacent the facing surfaces of the pin and box ends in such manner and position that they become aligned whenever the pin and box ends are rotated to a predetermined relative rotational position.

BRIEF DESCRIPTION OF THE DRAWINGS

The apparatus of the invention is further described in relation to the following drawings wherein.

Like reference numerals are used to indicate like parts in all figures of the drawings.

DESCRIPTION OF THE PREFERRED EMBODIMENTS

Referring to FIGS. 1-5, connector assembly 10 preferably comprises box end 12 and pin end 14, which are adapted to be slidably engaged and rotationally locked, thereby limiting further translational or rotational motion between box end 12 and pin end 14 until such time as connector assembly 10 is unlocked. According to one preferred embodiment of the invention, box end 12 comprises substantially cylindrical body 16 having diametrically opposed, outwardly facing longitudinal flutes 26, 27 with longitudinal slots 24, 25, respectively, disposed therein. Slots 24, 25 provide access to cylindrical bore 28 of body 16. The width of flutes 26, 27 is desirably sufficient to admit the fingertips of the user during unlocking, as described in further detail below.

Figure 1:
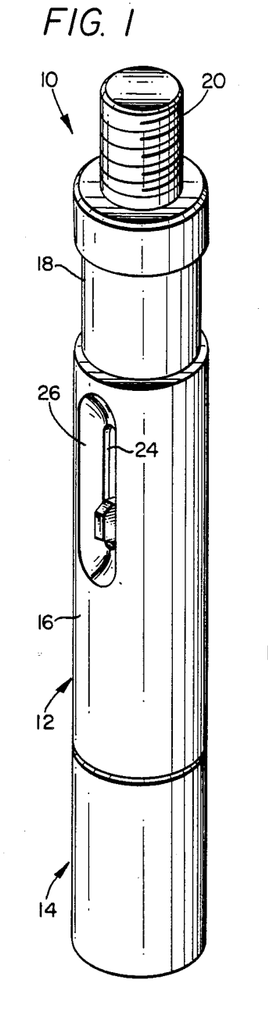
FIG. 1 is a perspective view depicting one preferred embodiment of the connector assembly of the invention wherein the pin and box ends of the connector assembly are fully engaged and locked.
Figure 2:
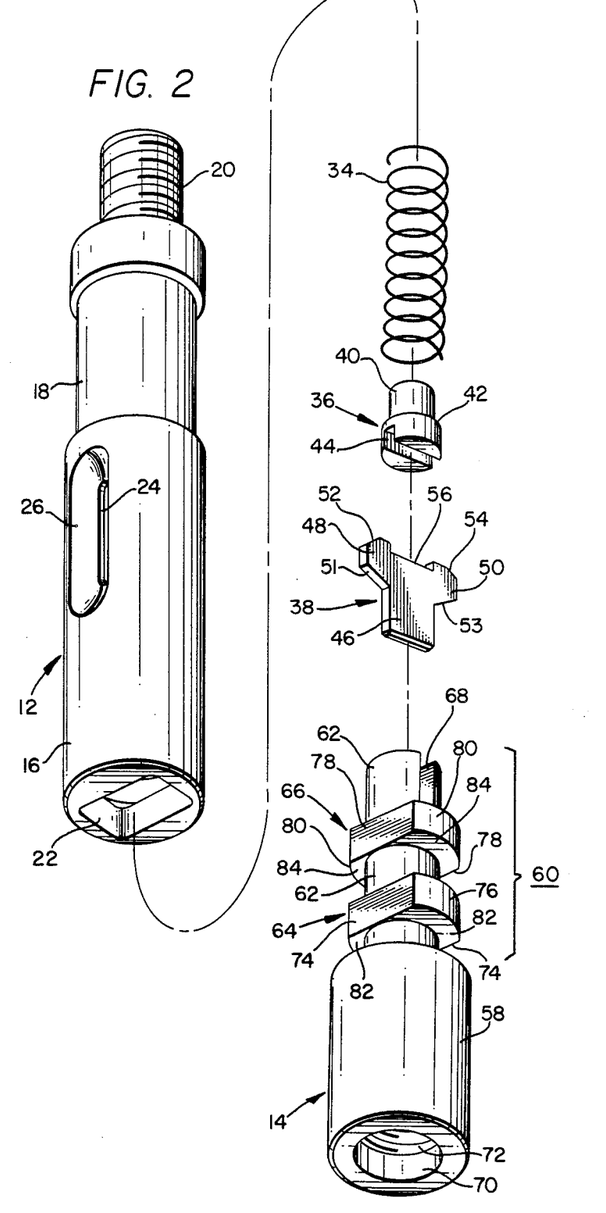
FIG. 2 is an exploded perspective view depicting the box and pin ends of the subject connector assembly and the structural elements that are slidably disposed within the box end of the subject connector assembly.

Fishneck 18 is optionally provided for use in retrieving connector assembly 10 and any other tool or stem section connected to it from a well bore in the event of a broken wire or other downhole failure. Male thread 20 is provided at one end of box end 12 to facilitate attachment to existing wireline tools or stem sections.

Figure 4:
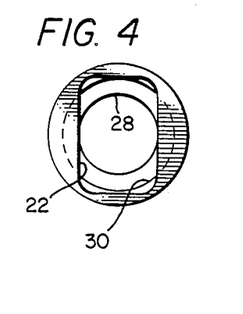
FIG. 4 is a bottom plan view of the body of the box end of the subject connector assembly.

Cylindrical bore 28 of box end 12 preferably extends substantially the entire length of body 16, desirably terminating below male threads 20. Access to cylindrical bore 28 is provided through rectangular channel 22 at the lower end of body 16 as seen in FIGS. 2 and 4, as well as through slots 24, 25 as previously described. Cylindrical bore 28 preferably further comprises a plurality of longitudinally spaced, axially aligned cylindrical channels such as cylindrical channels 30, 32, having a diameter greater than that of cylindrical bore 28. The number, size and axial spacing of cylindrical channels such as cylindrical channels 30, 32 are discussed in more detail below in relation to the operation of connector assembly 10 of the invention.

Figure 3:
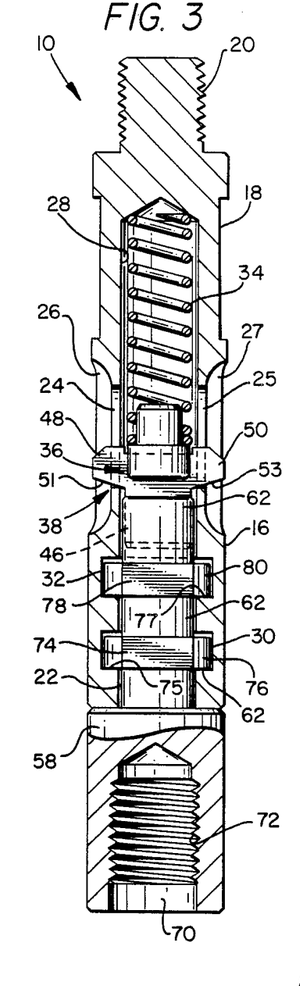
FIG. 3 is an elevation view, partially broken away, of the connector assembly of FIG. 1 in the slidably engaged and rotationally locked position.
Figure 5:
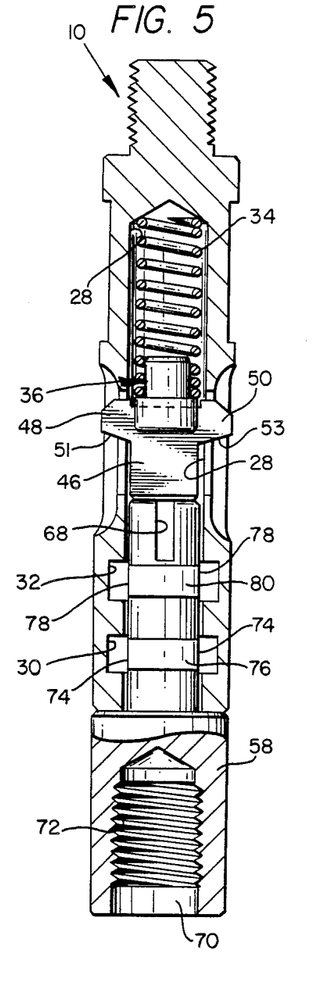
FIG. 5 is an elevation view, partially broken away, of the box and pin ends of the subject connector assembly wherein the pin end is fully inserted into the box end, but is not yet rotated and locked.

Referring to FIGS. 2, 3 and 5, box end 12 preferably further comprises spring 34, spring guide 36 and lock plate 38. Spring guide 36 preferably comprises a cylindrical stem 40 having a diameter slightly less than that of spring 34 and shoulder 42 having a diameter sufficient to retain spring 34 behind spring guide 36 when spring 34 is compressed inside cylindrical bore 28 of box end 12 as shown in FIGS. 3 and 5. Spring guide 36 is preferably adapted by means of slot 44 to receive lock plate 38 and thereafter restrict relative rotational motion therebetween.

Lock plate 38 preferably comprises shank 46 and ears 48, 50, chamfers 51, 53 and beveled edges 52, 54. Notch 56 between ears 48, 50 is optionally provided to restrict sideways slipping of plate 38 relative to spring guide 40 when lock plate 38 is inserted into slot 44.

Box end 12 of connector assembly 10 is preferably assembled by inserting cylindrical stem 40 of spring guide 36 into one end of spring 34. Box end 12 is thereafter inverted, and spring 34 and spring guide 36 are dropped, spring end first, into bore 28 through rectangular channel 22. While applying pressure to spring guide 36 through rectangular channel 22, thereby forcing spring guide 36 to a point at or about the ends of slots 24, 25 nearest the closed end of bore 28 and simultaneously compressing spring 34, lock plate 38 is inserted into body 16 through slot 24 or slot 25. Because lock plate 38 is desirably longer than slots 24, 25, lock plate 38 is inserted through slot 24 or slot 25 at an angle, and thereafter rotated to the position shown in FIGS. 3 and 5 with ears 48, 50 extending radially outwardly through slots 24, 25, respectively. During the insertion of lock plate 38 into body 16, slot 44 of spring guide 36 should be aligned parallel to slots 24, 25.

According to a preferred embodiment of the invention, ears 48, 50 of lock plate 38 will extend sufficiently through slots 24, 25 that they can be manually grasped and retracted against the force of spring 34. The maximum width of lock plate 38 between ears 48 and 50 is preferably less than the diameter of body 16 to reduce the likelihood of ears 48, 50 catching on another protruding object or obstruction when connector assembly 10 is run into a well bore. According to a preferred embodiment of the invention, the width of slots 24, 25 of body 16, slot 44 in spring guide 36 and slot 68 in nose 60 are all slightly greater than the thickness of lock plate 38, thereby permitting the insertion of lock plate 38 through and into those slots without excessive extra space that could cause undesirable freedom or wobble.

Pin end 14 of connector assembly 10 preferably further comprises cylindrical body 58 and nose 60. Nose 60 further comprises cylindrical stem sections 62 having axially spaced lugs 64, 66 connected in fixed relation thereto. According to the embodiment of connector assembly 10 shown in FIGS. 1 through 5, body 58 preferably comprises cylindrical bores 70 having female threads 72 adapted to receive and engage male threads from the pin end of a conventional wireline tool or stem section. Lugs 64, 66 preferably comprise opposed elongate flat side surfaces 74, 78, respectively, and opposed arcuate lobes 76, 80, respectively. According to a preferred embodiment of the invention, side surfaces 74, 78 of lugs 64, 66, respectively are substantially tangent to the outside surface of stem sections 62. The axial spacing between lugs 64, 66 is preferably the same as the axial spacing of cylindrical channels 30, 32 of box end 12, and the radius of arcuate lobes 76, 78 is preferably slightly less than the radius of cylindrical channels 30, 32 of box end 12. Flat surfaces 74, 78 of lugs 64, 66 are preferably parallel, and the overall dimensions of lugs 64, 66 are preferably slightly less than the dimensions of rectangular channel 22 of box end 12 of the invention. Slot 68 in the uppermost cylindrical stem section 62 is provided for engagement with shank 46 of lock plate 38 when connector assembly 10 is locked. Slot 68 is desirably parallel to flat side surfaces 74, 78 of lugs 64, 66.

The use and operation of connector assembly 10 of the invention is further described and explained in relation to FIGS. 3 through 5 of the drawings. To engage box end 12 and pin end 14 of connector assembly 10 of the invention, pin end 14 is first co-axially aligned with cylindrical bore 28 of box end 12 opposite rectangular channel 22. The rotational alignment of pin end 14 relative to box end 12 is desirably such that lugs 64, 66 of pin end 14 are aligned with rectangular channel 22 of box end 12. When aligned in this manner, nose 60 of pin end 14 is inserted axially into box end 12 until body 58 of pin end 14 abuts body 16 of box end 12. Whenever body 58 of pin end 14 and body 16 of box end 12 are in contacting and abutting relation, lugs 64, 66 are desirably aligned with cylindrical channels 30, 32. Because the major axis of rectangular channel 22 is desirably perpendicular to the radial axis extending through slots 24, 25 of box ends 12, and because slot 68 in nose 60 is desirably parallel to lugs 64, 66, slot 68 is perpendicular to the major transverse dimension of shank 46 of lock plate 38 when pin end 14 is first inserted into box end 12 of connector assembly 12. Because of the perpendicular relationship between shank 46 and slot 68, shank 46 is forced upward, compressing spring 34. According to a preferred embodiment of the invention, whenever lugs 64, 66 are aligned with cylindrical channels 30, 32 during insertion of nose 60 of pin end 14 into box end 12, ears 48, 50 of lock plate 38 will be forced upward to a point near the top of slots 24, 25.

Once nose 60 of pin end 14 is inserted sufficiently that body 58 of pin end 14 abuts body 16 of box end 12, either pin end 14 or box end 12 is rotated 90 relative to the other in either direction. This rotation causes lugs 64, 66 to rotate to a position in which their major transverse dimension is perpendicular to the major transverse dimension of rectangular channel 22. Simultaneously with the realignment of lugs 64, 66 in cylindrical channels 30, 32, slot 68 in nose 60 is brought into parallel alignment with the major transverse dimension of shank 46, permitting spring 24 to force shank 46 downward into slot 68. Once shank 46 has engaged slot 68, ears 48, 50 extending through slots 24, 25 in body 16 of box end 12 restrict further rotational motion of pin end 14 relative to box end 12 until such time as lock plate 38 is again retracted, disengaging shank 46 from slot 68.

Once lobes 76, 80 of pin end 14 are rotated from the position shown in FIG. 5 to the position shown in FIG. 3, the support surfaces 82, 84 of arcuate lobes 76, 80 of lugs 64, 66, respectively, are disposed opposite annular shoulders 75, 77 of cylindrical channels 30, 32. When connector assembly 10 is thereafter subjected to tensile loading, the cumulative area of contact between support surfaces 82, 84 and the opposed arcuate sections of annular shoulders 75, 77 determine the shear area available to withstand the tensile force. According to a preferred embodiment of the invention, the shear area between lugs 64, 66 and annular shoulders 75, 77 is greater than the shear area in a conventional threaded connection in a wireline tool string.

In view of the foregoing explanation, it will be apparent to those of ordinary skill in the art that the dimensions of and spacings between lugs 64, 66 and the associated dimensions of and spacings between cylindrical channels 30, 32 must be adequate to withstand the expected shear forces and avoid stress concentrations that might lead to premature failure during prolonged use. Although the preferred embodiment of connector assembly 10 as shown in FIGS. 1-5 utilizes two longitudinally spaced locking lugs, it will be similarly apparent to those of ordinary skill in the art that the number of locking lugs on the pin end and the corresponding number of cylindrical recesses in the box end can vary from one up to some greater number that is effectively limited only by the thickness of the lugs, the length of the connector assembly, and the manufacturing expense.

In order to release and disconnect the pin and box ends of connector assembly 10, ears 48, 50 are desirably forced upward by applying direct manual force to chamfers 51, 53, thereby compressing spring 34 within cylindrical bore 28 and withdrawing shank 46 from engagement with slot 68 of pin end 14. Once shank 46 of lock plate 38 is clear of slot 68, either box end 12 or pin end 14 is again rotated 90 relative to the other in either direction to realign arcuate lobes 76, 80 of lugs 64, 66 with rectangular channel 22 in the lower end of box end 12. When lugs 64, 66 and rectangular channel 22 are thus aligned, pin end 14 and box end 12 can be easily separated by sliding them apart axially.

When spring guide 36, lock plate 38, nose 60 and body 16 are constructed as disclosed herein, the unintentional application of force to either of ears 48, 50, but not the simultaneous application of force to both, in the upward direction will cause shank 46 to bind against cylindrical bore 28 and the bottom of slot 68, thereby preventing shank 46 from retracting a sufficient distance upward that it can disengage from slot 68. Such a situation might occur, for example, if one of the ears 48, 50 accidentally snagged an obstruction in the well bore. Because shank 46 will not completely disengage from slot 68 unless an upwardly directed force is simultaneously applied to ears 48, 50 and because lugs 64, 66 cannot be rotated and withdrawn from cylindrical channels 30, 32 until shank 46 is disengaged from slot 68, the unintentional application of force to one side of lock plate 38 of connector assembly 10 cannot cause the pin and box ends of connector assembly 10 to be unintentionally disconnected.

Figures 6A, 6B:
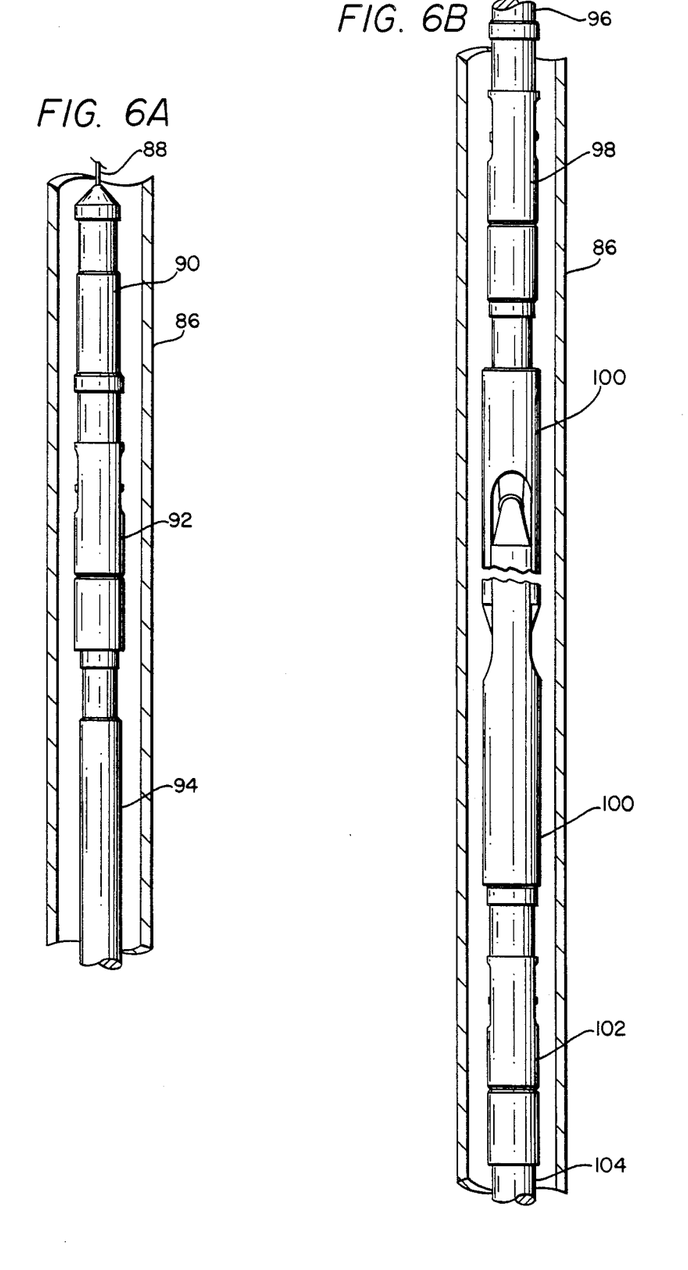
FIG. 6a is an elevation view, partially in section, depicting the upper end of a wireline tool string disposed within production tubing in a well bore.
FIG. 6b is an elevation view, partially in section, depicting another segment of a wireline tool string disposed in a well bore.

The use of connector assembly 10 in a wireline tool string is further described in relation to FIGS. 6a and 6b. Referring to FIG. 6a, rope socket 90 is suspended from wireline 88 within production tubing 86 disposed in a well bore. Stem section 94 is connected to rope socket 90 by means of connector assembly 92 as described above in relation to FIGS. 1-5. Referring to FIG. 6b, the lower end of a stem section 96 is connected to the upper end of jars 100 by connector assembly 98 that is analogous to connector assembly 10 of the invention. Similarly, the lower end of mechanical jars 100 is connected to the upper end of another stem section 104 by connector assembly 102.

Figure 7:
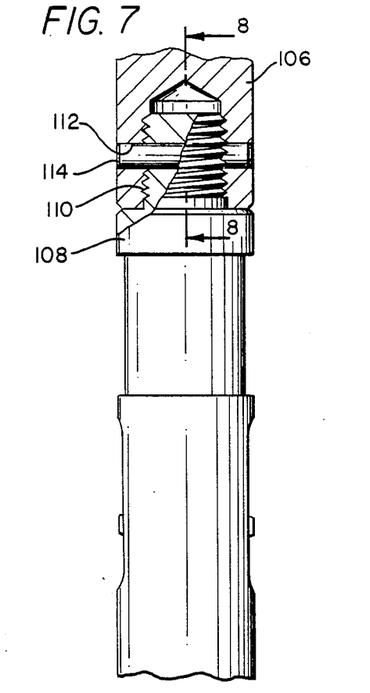
FIG. 7 is an elevation view, partially in section, depicting structure useful for attaching one embodiment of the connector assembly of the invention to an existing wireline stem section.
Figure 8:
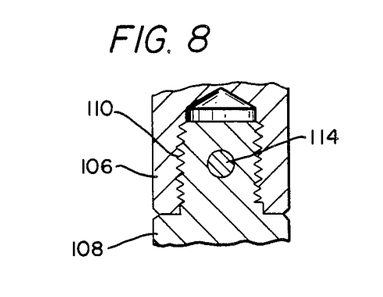
FIG. 8 is a sectional elevation view taken along line 8—8 of FIG. 7.

A preferred method and apparatus for retrofitting existing wireline tools and stem sections to utilize the connector assembly of the invention is shown and described in relation to FIGS. 7 and 8. Referring to those figures, male threads 110 on box end 108 of a connector assembly as disclosed herein are threaded into engagement with the downwardly extending box end 106 of a wireline tool or stem section. Hole 112 is thereafter drilled radially through the threaded connection, and pin 114 is inserted to restrict any further relative rotational movement between the male and female threads.

Figure 9:
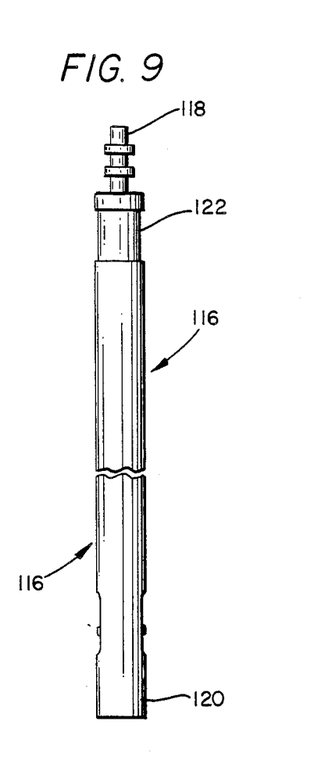
FIG. 9 is an elevation view of a stem section for use in a wireline tool string wherein the stem section has been manufactured with integrally formed pin and box ends of the connector assembly of the invention.

Another embodiment of the invention is depicted in simplified form in FIG. 9 wherein stem section 116 of a wireline tool assembly has been manufactured with pin end 118 and box end 120 of the connector assembly of the invention disposed at opposite ends thereof. When fabricated in this manner, stem section 116 can be quickly and conveniently coupled to other similarly manufactured tools and stem sections in a wireline tool string. As depicted in FIG. 9, fishneck 122 is provided adjacent pin end 118 of stem section 116 for use in retrieving stem section 116 in the event of a downhole failure.

Figure 10:
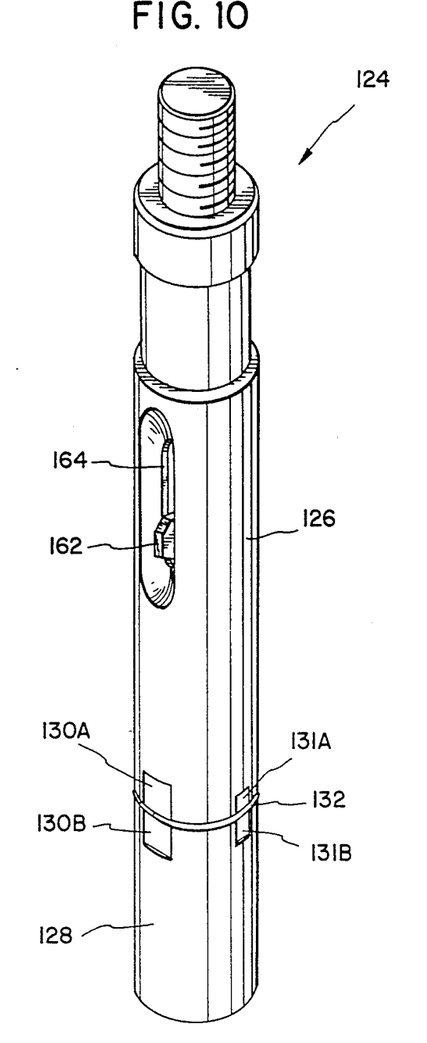
FIG. 10 is a perspective view depicting another preferred embodiment of the connector assembly of the invention wherein the pin and box ends each comprise externally visible means adjacent their abutting surfaces for determining whenever the pin and box ends are rotated into a predetermined, preferred relative rotational alignment.

FIG. 10 depicts another preferred embodiment of the invention wherein visible means are provided on the outside surfaces of the pin and box ends of the subject connector assembly for determining when the pin and box ends are in a preferred predetermined relative rotational alignment. One preferred way to provide externally visible indicia is to mill flats on the outside surfaces of both the pin and box ends at desired locations.

Referring to FIG. 10, connector assembly 124 comprises box end 126 and pin end 128. Box end 126 preferably comprises a first flat area 130A and a second, smaller flat area 131A. Pin end 128 likewise preferably comprises a first flat area 130B and a second, smaller flat area 131B. Flat areas 130A and 130B, and flat areas 31A and 131B, are preferably located adjacent to the edges of box end 126 and pin end 128, respectively, so that they are oppositely disposed across abutment line 132 between box end 126 and pin end 128 whenever the box and pin ends of connector assembly 124 are fully engaged and locked. Flat areas 130A and 131A are preferably disposed 90° apart around the lower edge of box end 126. Flat areas 130B and 131B are preferably disposed 90° apart around the upper edge of the body of pin end 128. This 90° preferred spacing corresponds to the 90° of relative rotation between box end 126 and pin end 128 required to fully engage or disengage the pin and box ends as previously described and explained in relation to FIGS. 1 through 5. Although not visible in FIG. 10, it is understood that identical large and small flats are preferably disposed 180° apart from those shown so that such indicia will be readily visible from either side of connector assembly 124.

With the configuration of FIG. 10, whenever pin end 128 is being inserted into box end 126, flat area 131A is centered opposite flat area 130B. Once pin end 128 is fully inserted and rotated 90° to the locked position, flat area 130B becomes aligned with flat area 130A, and flat area 131A becomes aligned with flat area 131B. As discussed above in relation to FIGS. 1 through 5, complete locking is further indicated by the movement of ear 162 to the bottom of elongate slot 164.

For unlocking and disassembly, once ear 162 has been retracted against the spring bias within box end 126, box end 126 and pin end 128 are again rotated 90° relative to each other, until flat area 131A of box end 126 is again centered opposite flat area 130B of pin end 128. Flat areas 131A and 130B are maintained in this alignment until pin end 128 is fully withdrawn from box end 126.

Although large and small flats are depicted in FIG. 10 as the indicia by which the relative rotational positions of box end 126 and pin end 128 are determined, it will be understood and appreciated upon reading this disclosure that other indicia can be similarly used. Thus, for example, box end 126 and pin end 128 might each be scored or otherwise marked to achieve the same functional capability. Likewise, only a single set of opposed indicia might be used, to mark the proper alignment for insertion or withdrawal, while relying upon alignment of the index on the pin end with the elongate slot or ear on the box end to indicate rotation to the fully locked position.

Figure 11:
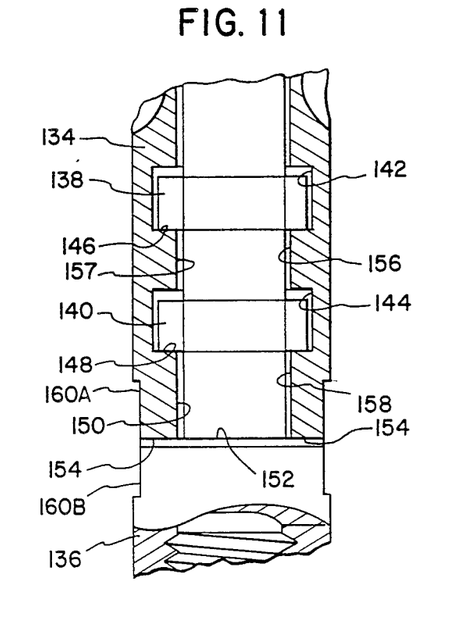
FIG. 11 is an enlarged cross-sectional detail view depicting another preferred embodiment of the invention wherein the pin and box ends of the subject connector assembly comprise means for limiting relative rotational motion between the pin and box ends until the pin end is fully inserted into the box end.

FIG. 11 depicts another preferred embodiment of the invention wherein box end 134 and pin end 136 are constructed in such manner that relative rotation between them is restricted until axially spaced locking lugs 138, 140 are axially aligned with radially disposed annular channels 142, 144, respectively. It has been discovered that when quick-lock connector assemblies are used in the field, if means are not provided for preventing the first set of axially spaced locking lugs from rotating into the first annular channel passed during insertion, even a slight unintentional relative rotation between the box and pin ends during insertion can impede complete locking. Thus, if locking lug 138 is not prevented from rotating into annular channel 144, it may become unintentionally engaged in annular channel 144 before reaching annular channel 142, thereby preventing the connector assembly from being fully engaged and locked until the box end and pin end are again rotated to a position where locking lug 138 can pass through the radial restriction presented by sidewall sections 156, 157.

According to the embodiment shown in FIG. 11, this feature of the invention is achieved by making the distance between axially spaced lugs 138, 140 less than the axial length of sidewall sections 150, 15B of box end 134. With this configuration, whenever pin end 136 is inserted into box end 134, lug 138 cannot be rotated into annular channel 144 because lug 140 will contact and be blocked by sidewall sections 150, 158. Use of the configuration depicted in FIG. 11 permits lugs 138, 140 and annular channels 142, 144, respectively, to be made with the same axial and radial dimensions. It is understood, however, that a similar functional benefit can be achieved by making the axial or radial dimension of lug 138 greater than the corresponding axial or radial dimension of annular channel 144.

While the connector assembly of the invention is described herein in its preferred orientation with the box end disposed above the pin end when engaged and locked, it will be apparent that the subject apparatus can be similarly utilized in the reverse configuration if desired. Other alterations and modifications of the connector assembly of the invention will become apparent to those of ordinary skill in the art upon reading this disclosure, and it is intended that the scope of the invention be limited only by the broadest interpretation of the appended claims to which the inventor is legally entitled.

I claim:

1. A connector assembly suitable for use in connecting tools and stem sections in wireline tool strings, said connector assembly comprising coaxially aligned pin and box ends;
    said pin end comprising axially spaced lugs adapted to be inserted into said box end and thereafter rotated into axially spaced annular channels within said box end so as to engage annular shoulders within said box end to thereby limit further relative axial movement between said pin end and said box end;
    a transverse slot disposed in a forwardly extending face of said pin end;
    a spring-biased locking plate disposed within said box end adapted to slidably engage said transverse slot in said pin end upon rotation of said pin end relative to said box end following full insertion of said pin end into said box end to thereby limit further relative rotational movement between said pin end and said box end, said locking plate comprising externally accessible, manually manipulatable means for selectively forcing said locking plate away from said pin end against said spring bias to disengage said locking plate from said pin end;
    said box end comprising diametrically opposed, outwardly facing, axially extending flutes, an axial bore, and diametrically opposed, longitudinally extending slots communicating between said flutes and said bore;
    said manually manipulatable means comprising ears that extend radially outward through said slots into said flutes but not radially beyond said flutes, so as to be manually manipulatable within said flutes in the axial direction away from said pin end to disengage said locking plate from said pin end;
    said pin end and said box end further comprising means for limiting relative rotational movement therebetween during insertion of said pin end into said box end until said pin end is inserted sufficiently into said box end that all of said axially spaced lugs are axially aligned with said axially spaced annular channels.

2. The connector assembly of claim 1 wherein said means for limiting relative rotational movement between said pin end and said box end during insertion of said pin end into said box end comprises a radial restriction in the bore of said box end that prevents said axially spaced lugs on said pin end from substantial rotation within said bore of said box end until said axially spaced lugs are axially aligned with said axially spaced annular channels.

3. The connector assembly of claim 2 wherein said radial restriction is disposed adjacent to the point of insertion of said pin end into said box end, and has an axial length greater than the axial distance between said axially spaced lugs.

4. A connector assembly suitable for use in connecting tools and stem sections in wireline tool strings, said connector assembly comprising coaxially aligned pin and box ends;
    said pin end comprising axially spaced lugs adapted to be inserted into said box end and thereafter rotated into axially spaced annular channels within said box end so as to engage annular shoulders within said box end to thereby limit further relative axial movement between said pin end and said box end;
    a transverse slot disposed in a forwardly extending face of said pin end;
    a spring-biased locking plate disposed within said box end adapted to slidably engage said transverse slot in said pin end upon rotation of said pin end relative to said box end following full insertion of said pin end into said box end to thereby limit further relative rotational movement between said pin end and said box end, said locking plate comprising externally accessible, manually manipulatable means for selectively forcing said locking plate away from said pin end against said spring bias to disengage said locking plate from said pin end;
    said box end comprising diametrically opposed, outwardly facing, axially extending flutes, an axial bore, and diametrically opposed, longitudinally extending slots communicating between said flutes and said bore;

said manually manipulatable means comprising ears that extend radially outward through said slots into said flutes but not radially beyond said flutes, so as to be manually manipulatable within said flutes in the axial direction away from said pin end to disengage said locking plate from said pin end;

said pin and box ends further comprising externally visible means for determining the relative rotational position between said pin and box ends whenever said pin end is at least partially inserted into said box end.

5. The connector assembly of claim 4 wherein said means for determining the relative rotational position between said pin and box ends comprises flats disposed on said pin and box ends.

6. A connector assembly suitable for use in connecting tools and stem sections in wireline tool strings, said connector assembly comprising a box end and a pin end, said pin end comprising lugs adapted to be inserted longitudinally into said box end and thereafter rotated to engage annular shoulders within said box end to limit further relative longitudinal motion therebetween; said pin end further comprising a transverse slot disposed in a forwardly extending face thereof; and a spring-biased locking plate disposed within said box end adapted to slidably engage said transverse slot in said pin end upon rotation of said pin end relative to said box end following insertion of said pin end in said box end and thereby limit further relative rotational motion therebetween, said locking plate comprising externally accessible, manually manipulatable means for selectively forcing said locking plate away from said pin end against said spring bias to disengage said locking plate from said pin end, said means having a maximum width less than the maximum width of said box end; said box end comprising diametrically opposed, outwardly facing, longitudinally extending flutes, an axial bore, and diametrically opposed, longitudinally extending slots communicating between said flutes and said bore; and said means comprising ears that extend radially outward through said slots into said flutes but not radially beyond said flutes so as to be manually manipulatable within said flutes in the longitudinal direction away from said pin end to disengage said locking plate from said pin end.

7. The connector assembly of claim 6 wherein said box end and said pin end are each further adapted to threadedly engage wireline tools.

8. The connector assembly of claim 6 wherein said box end and said pin end are each unitarily manufactured onto opposite ends of a wireline tool.

9. The connector assembly of claim 6 applied to wireline tools in such manner that one end of each wireline tool comprises said box end and the other end of said wireline tool comprises said pin end.

10. A connector assembly for releasably connecting tools in a wireline tool string, said connector assembly comprising pin and box ends and a manually releasable locking means;

said pin end comprising a transverse slot disposed in a forwardly extending face thereof, and radially extending lugs adapted to be slidably inserted into cylindrical channels communicating with an axial bore in said box end and thereafter rotated into engagement with opposite annular shoulders adjacent to said axial bore so as to limit further relative longitudinal motion therebetween;

said locking means comprising a spring-biased locking plate disposed within said box end, said locking plate adapted to abut said forwardly extending face of said pin end upon insertion of said pin end into said box end and to thereafter slidably engage said transverse slot in said face of said pin end to rotationally lock said pin end relative to said box end following rotation of said pin end approximately 90 degrees relative to said box end;

said box end further comprising diametrically opposed, longitudinally extending flutes and slots within said flutes providing access to said axial bore;

said locking plate further comprising ears adapted to extend radially through said slots and into said flutes, said ears being slidably disposed in said slots and in said flutes so as to not extend radially beyond said flutes but being manually munipulatable against said spring bias in the longitudinal direction to disengage said locking plate from said pin end and thereby permit said pin end to be rotated about 90 degrees relative to said box end and thereafter slidably withdrawn from said box end.

11. A connector assembly for use with wireline tool strings, said connector assembly comprising a box end, a pin end, and a latch means;

said pin end further comprising first and second coaxially aligned cylindrical shaft sections having respective first and second diameters, said first diameter being less than said second diameter; at least one lug comprising radially extending lobes connected in fixed relation to said first shaft section, said lobes being longitudinally spaced apart from the end of said first shaft section opposite said second shaft section with a transverse slot being disposed in said end of said first shaft section;

said box end further comprising a substantially cylindrical body having an outside diameter substantially the same as said second shaft section of said pin end; an axial bore within said body, said bore extending from one end of said body to an occluded end inwardly disposed from the opposite end of said body and having a diameter slightly greater than the diameter of said first shaft section of said pin end but less than the distance spanned by said lobes; channel means within said body communicating with said axial bore and further adapted to receive said first shaft section and said lug of said pin end therethrough; at least one cylindrical channel concentric with said bore adapted to receive said lobes of said pin end whenever said first shaft section of said pin end is slidably inserted through said channel means of said box end sufficiently that said second shaft section of said pin end abuts said box end and is thereafter rotated about 90 degrees in either direction, said cylindrical channel further comprising annular shoulders adapted to retain and support said lobes, limiting further longitudinal motion until said pin end is again rotated about 90 degrees in either direction; diametrically opposed, outwardly facing, longitudinally extending flutes disposed in said body; longitudinally extending slots connecting said flutes to said cylindrical bore;

said latch means comprising a coil spring disposed in said cylindrical bore of said box end at the occluded end of said bore; a spring guide adapted to retain said spring within the occluded end of said bore and further comprising a transverse slot in the end thereof opposite said spring, said transverse slot being radially aligned with said longitudinal slots in said body; and a lock plate;

said lock plate comprising an upper end adapted to engage the slot in said spring guide; diametrically opposed, radially extending ears adapted to slidably engage the longitudinal slots in said body and extend radially outward through said slots into said flutes so as to be accessible for manual manipulation therein in the longitudinal direction; and a downwardly extending shank portion adapted to abut the slotted end of said first shaft section of said pin end in a radial direction perpendicular to said slot when said pin end is slidably inserted into engagement with said box end, and to releasably engage said slot when said pin end is thereafter rotated about 90 degrees relative to said box end;

said connector assembly being thereby adapted to be slidably engaged and rotationally locked by inserting a portion of said pin end into said box end and thereafter rotating said pin end about 90 degrees relative to said box end, and being further adapted to be unlocked and disengaged by directly applying manual pressure to said ears of said lock plate against said spring guide and said spring in a direction opposite to said pin end, thereby disengaging said shank portion of said lock plate from said slot in said pin end, permitting said pin end to be again rotated about 90 degrees relative to said box end and thereafter slidably withdrawn from said box end.

* * * * *